United States Patent [19]

Hansen

[11] Patent Number: 4,489,319
[45] Date of Patent: Dec. 18, 1984

[54] DETECTOR WITH VARIANCE SENSITIVITY

[75] Inventor: V. Gregers Hansen, Framingham, Mass.

[73] Assignee: Raytheon Company, Lexington, Mass.

[21] Appl. No.: 480,780

[22] Filed: Apr. 8, 1983

Related U.S. Application Data

[63] Continuation of Ser. No. 241,164, Mar. 6, 1981, abandoned, which is a continuation of Ser. No. 070,276, Aug. 27, 1979, abandoned.

[51] Int. Cl.³ .................... G01S 7/30; G01S 13/02
[52] U.S. Cl. ................... 343/7 A; 343/5 CF; 367/98
[58] Field of Search .......... 367/901; 343/5 CE, 5 CF, 343/5 DP, 5 VQ, 100 CL, 7 A

[56] References Cited

U.S. PATENT DOCUMENTS

| | | | |
|---|---|---|---|
| 2,842,761 | 7/1958 | Downs | 343/5 VQ X |
| 3,946,382 | 3/1976 | Kossiakoff et al. | 343/5 CF X |
| 3,968,490 | 7/1976 | Gostin | 343/7 A X |
| 3,995,270 | 11/1976 | Perry et al. | 343/5 CF X |
| 4,031,364 | 6/1977 | Wilmot | 343/5 DP X |
| 4,047,172 | 9/1977 | Bauer et al. | 367/901 X |
| 4,074,264 | 2/1978 | Wilmot | 343/5 DP X |
| 4,148,025 | 4/1979 | Seiersen | 343/5 VQ |
| 4,213,127 | 7/1980 | Cole | 343/5 CF |
| 4,249,177 | 2/1981 | Chen | 343/7 A |

*Primary Examiner*—Maynard R. Wilbur
*Assistant Examiner*—Gilberto Barrón, Jr.
*Attorney, Agent, or Firm*—Walter F. Dawson; Richard M. Sharkansky; Joseph D. Pannone

[57] ABSTRACT

In a radar or sonar system wherein the detection of a target is to be accomplished with a constant false alarm rate (CFAR), a circuit is provided for adjusting the input to a comparator which compares the received echo signals against the value of a threshold in order to detect targets of interest. The mean value of the background noise is subtracted from the signal, and the resulting difference is divided by the square root of the variance of background noise. The use of the variance compensates for sweep-to-sweep correlation and non-stationarity (in the statistical sense) as is found in clutter so that the clutter, upon the customary sweep-to-sweep integration of the signal, does not tend to introduce a false echo.

2 Claims, 13 Drawing Figures

DETECTOR WITH VARIANCE SENSITIVITY

This application is a continuation of application Ser. No. 241,164, filed 3/6/81, abandoned, which is a continuation of application Ser. No. 70,276, filed 8/27/79, abandoned.

BACKGROUND OF THE INVENTION

Target detection systems, whether they be radar or sonar, view both noise and clutter in addition to the target. A typical source of clutter is the rough surface of an ocean surrounding a ship-borne radar. The surface of the ocean can also be a source of clutter to a sonar system. Raindrops can serve as a source of clutter in the situation wherein several sweeps of a radar occur within an interval of time which is short compared to the period of raindrop activity. Range gating is employed in such detection systems for dividing each range sweep into a set of range cells in which one or more targets may be detected. Target echo signals are compared to a threshold by a comparator to determine the presence of a target. Statistically, there is a rate at which detections are erroneously reported due to the presence of noise and clutter, the rate being known as a false alarm rate. Circuitry which adjusts the relative magnitudes of the signal to the threshold in inverse proportion with the mean value of the background noise to provide a constant false alarm (CFAR) are often referred to as CFAR systems or circuits. To increase the sensitivity of detection, detection systems typically employ sweep-to-sweep integration for each range cell. A CFAR circuit placed ahead of the integrator reduces the dynamic range requirements of the integrator, thereby simplifying the circuitry of the integrator.

In the ordinary CFAR circuit, the amplitude of the signal is divided by the mean value of a set of samples of the background noise to provide a constant false alarm rate. Alternatively, the mean value is applied to the reference terminal, or threshold, of the comparator as a scaling factor to provide the constant false alarm rate. Such circuits have been successfully employed, in the absence of clutter, since the noise shows statistical independence between successive range cells of a range as well as statistical independence between successive range sweeps. Thus, even with the aforementioned integration, there is generally no build-up of a false echo, in the statistical sense, since the noise tends to be cancelled by integration.

However, in the case of clutter, a problem has arisen. While clutter shows a noise-like statistical independence from cell to cell of a range sweep, the clutter does exhibit significant correlation from sweep to sweep and, in addition, may be characterized by a non-stationarity in the statistical sense. As a result, the aforementioned integration of the values of the signals in a range cell from sweep to sweep introduces a substantially larger signal value in the presence of clutter than in the absence of clutter. The larger signal from the clutter increases the false alarm rate in spite of the use of the conventional CFAR system. Thus, it is seen that the integrator of a radar or sonar detection system provides improved detection of targets in the absence of noise only, but offers relatively little improvement in the detection of a target in the presence of clutter.

SUMMARY OF THE INVENTION

The aforementioned problem is overcome and other advantages are provided by an additional CFAR system which, in accordance with the invention, has been modified to compensate for clutter by providing a scale factor proportional to a statistical property of the target echo signal known as the standard deviation. The standard deviation is equal to the square root of the variance. A comparator which compares the echo signal to a threshold is used in making the decisions as to whether a target is present. The scale factor is applied to either the echo signal or to the threshold to alter their ratio to compensate for the increased signal amplitude observed at the output of the sweep-to-sweep integrator in the presence of clutter. Thus, the echo signal, as integrated by the integrator, is divided by the scale factor or, alternatively, the threshold is multiplied by the scale factor.

In one embodiment of the invention, the variance is obtained by subtracting the square of the sample mean (or first moment of the statistical process) of a set of samples of the echo signal from the sample second moment thereof. An averaging circuit followed by a squaring circuit provides the square of the mean. A squaring circuit followed by an averaging circuit provides the second moment. The variance is applied to a square-root circuit to provide the standard deviation. The mean value is subtracted from the echo signal, and the resulting difference is divided by the standard deviation to provide the clutter compensation.

In a preferred embodiment of the invention, the circuitry of the preceding embodiment is simplified by providing an approximation to the value of the standard deviation. The approximation is obtained by obtaining the magnitude of the difference between two successive samples of the target video, then obtaining an average of a set of values of the magnitude. The resulting approximation is essentially proportional to the value of the standard deviation. Thus, in the preferred embodiment of the invention, the necessity for circuitry performing the squaring and the square-root operation is avoided. In yet a further embodiment of the invention, an approximation for the standard deviation is obtained by utilizing a magnitude of the difference between the target video and a mean value thereof, a set of successive values of the magnitude being averaged to provide the approximation to the value of the standard deviation. While the use of digital sampling of the signals and digital shift registers are employed in the preferred embodiment of the invention, it is understood that analog sampling followed by registers formed of charge-coupled devices (CCD's) may be utilized.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
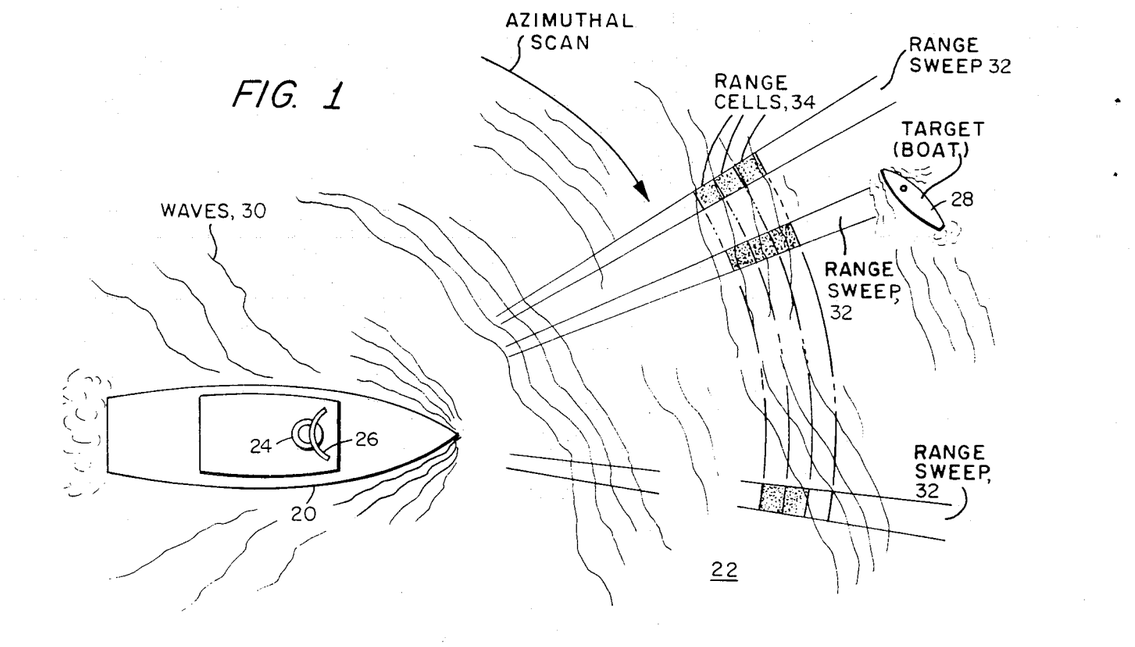
FIG. 1 is a stylized view of a ship on the ocean, the ship carrying a radar with an antenna scanning in azimuth.

Referring now to FIG. 1, there is seen a ship 20 sailing on the ocean 22, the ship 20 carrying a radar 24 having an antenna 26 which rotates about a vertical axis to provide an azimuthal scan for detecting objects, or radar targets, such as a sailboat 28 on the surface of the ocean 22. The echo signal incident upon the antenna 26 is composed of a radar return from the target, background noise, and clutter returns from waves 30 on the surface of the ocean 22. Another commonly occurring source of clutter in a radar signal is a thunderstorm wherein the heavy rains reflect the radar signal. Also seen in FIG. 1, superimposed upon the waves 30, is a diagrammatic representation of a succession of range sweeps 32 of the radar 24 as the antenna 26 scans in azimuth. Each of the sweeps 32 is seen to be composed of a set of range cells 34 wherein the range increment of a cell 34 is approximately equal to the range resolution capability of the waveform of the radar signal transmitted by the radar 24. For the case of a sonar system (not shown) carried by the ship 20 for observing an object below the surface of the ocean 22, the foregoing diagram of the sweeps 32 and the cells 34 is equally applicable. Also, the invention is equally applicable to the radar 24 and to the sonar for reducing the effect of clutter, be it the clutter in an electromagnetic signal reflected from the waves 30 or the clutter in a sonic signal reflected from the waves 30.

Figure 2:
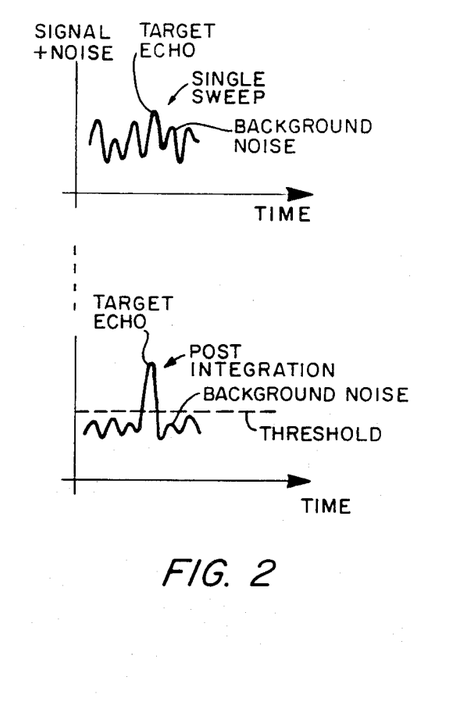
FIGS. 2 and 3 show graps of the target video signal of the radar of FIG. 1, respectively, for the situation wherein noise only is present and for the situation wherein clutter is present.
Figure 3:
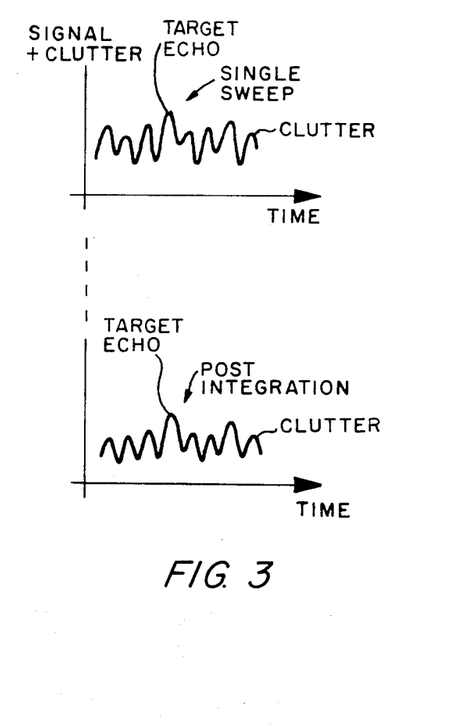

Referring now to the graphs of FIGS. 2 and 3, there are seen stylized representations of radar video signals under the influences of noise, in FIG. 2, and clutter, in FIG. 3. The first graphs in FIG. 2 and in FIG. 3 relate to a video signal such as that provided by an envelope detection unit which will be described with reference to FIG. 4. The second graphs in FIG. 2 and in FIG. 3 relate to the video signal subsequent to a sweep-to-sweep integration such as that provided by an integration unit which will be described with reference to FIG. 4. As seen in FIG. 2, the statistical properties of background noise, in particular, its lack of correlation from range cell to range cell as well as from sweep to sweep, provide for a reduction in the noise component of the video signal and an enlargement in the echo from the target. With respect to the clutter, as seen in FIG. 3, the statistical properties of the clutter wherein there is significant correlation, but not complete correlation, from sweep to sweep result in significantly less improvement in the ratio of target echo amplitude to the clutter background after the integration process than was seen in FIG. 2 for the case of background noise. The clutter correlation time is well in excess of a sweep interval of the radar 24 for the cases of clutter emanating from the ocean waves 30 as well as from the heavy rains associated with thunderstorms. As will be seen in FIG. 4, the invention provides for a reduction in the clutter level relative to the amplitude of the target echo by means of the CFAR unit utilizing the standard deviation of the radar video signal.

Figure 4:
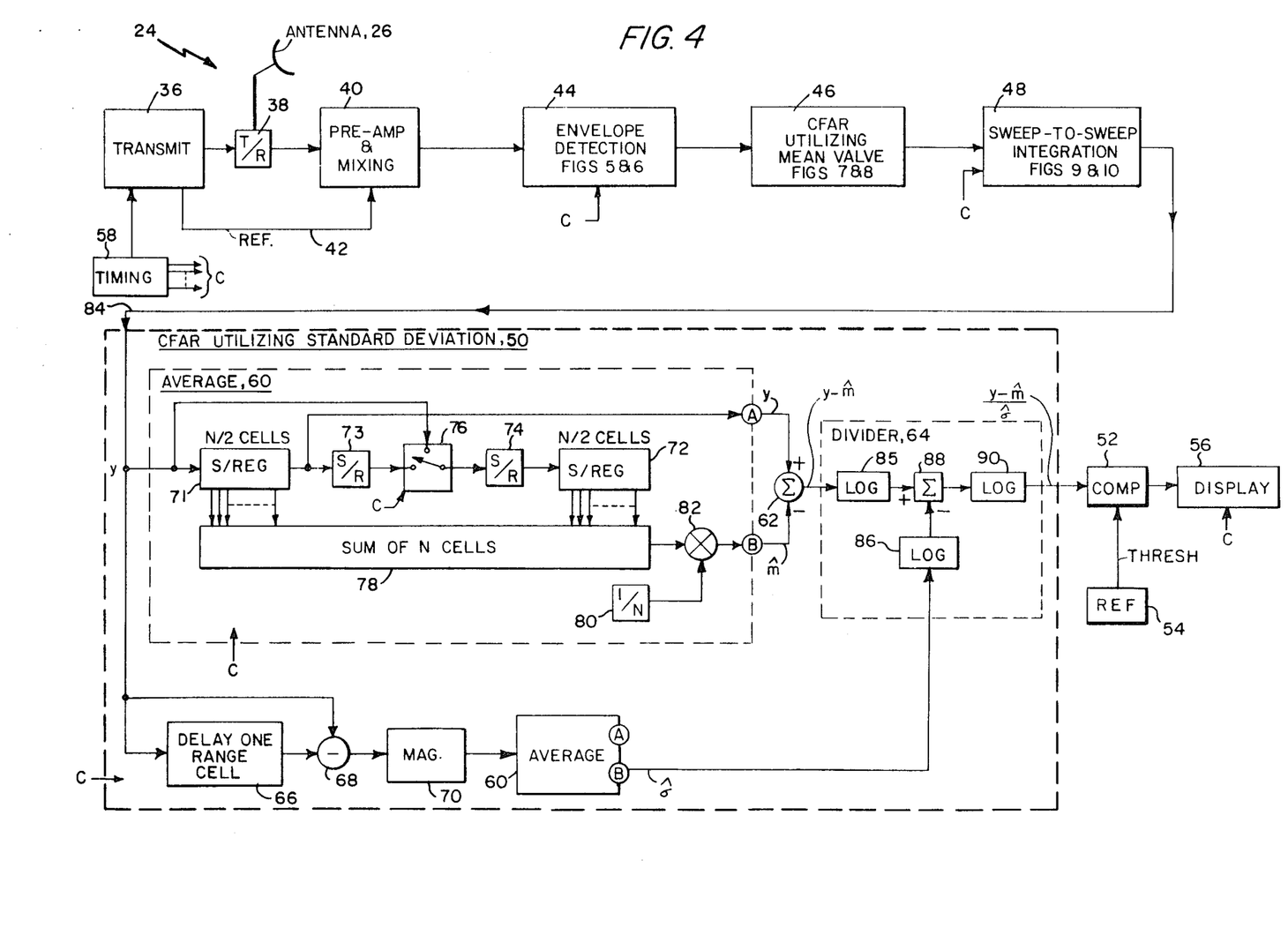
FIG. 4 is a block diagram of the radar of FIG. 1, FIG. 4 showing a CFAR system utilizing the standard deviation in accordance with the invention.

Referring now to FIG. 4, there is presented a block diagram of the radar 24 of FIG. 1. The radar 24 is seen to comprise a transmitter 36, a transmit-receive circuit 38 for coupling signals from the transmitter 36 to the antenna 26, and an amplifier system 40 for receiving echo signals from the antenna 26 via the circuit 38, the amplifier system 40 being understood to include preamplifiers, mixing circuits, and filters at an intermediate frequency (IF) as is commonly employed in a radar. A reference signal from an oscillator (not shown) within the transmitter 36 is utilized for translating the radar signal to a carrier frequency as is well known in the radar art, the reference signal being coupled via line 42 to the amplifier system 40 for translating the received echo at the carrier frequency to the intermediate frequency. The radar 24 further comprises an envelope detection unit 44, a CFAR unit 46 utilizing the mean value of the video signal provided by the detection unit 44, an integration unit 48, a CFAR unit 50 incorporating the invention and utilizing the standard deviation of the radar video signal after it has been integrated by the integration unit 48, a comparator 52 for comparing the signal of the CFAR unit 50 with a threshold signal provided by a reference signal source 54, a display 56, and a timing unit 58 seen coupled to the transmitter 36 and providing a set of output timing signals, identified by the legend C, for synchronizing the operation of the various units of the radar 24.

Figure 7:
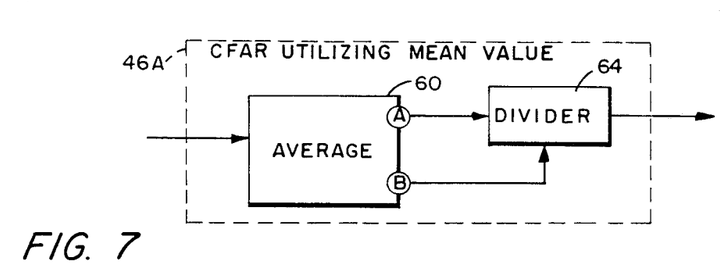
FIGS. 7 and 8 show alternative embodiments of a CFAR unit of FIG. 4 utilizing the mean value.
Figure 8:
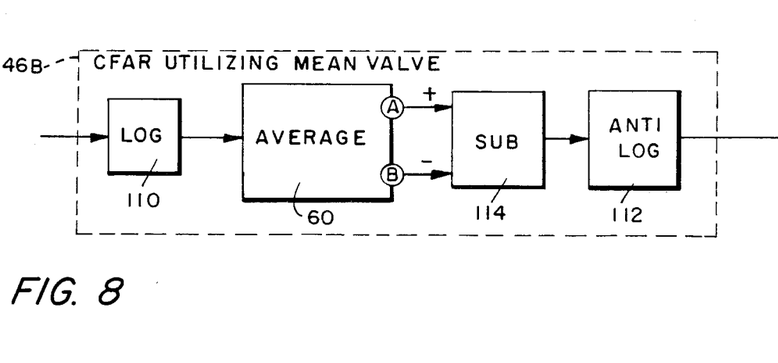

In operation, the signal is transmitted from the transmitter 36 via the antenna 26 to a target, such as the boat 28 of FIG. 1, an echo signal reflected from the target to the antenna 26 being coupled via the amplifier system 40 to the envelope detection unit 44. Exemplary circuitry for the detection unit 44 will be seen with reference to FIGS. 5 and 6. The CFAR unit 46, as will be seen with reference to exemplary circuitry of FIGS. 7 and 8, provides for a normalizing of the amplitude of the target video signal of the detection unit 44 by dividing the video signal by the mean value of a set of sequential ones of the video signals appearing in a single range sweep of the radar 24. The integration unit 48, as will be seen with reference to the exemplary circuitry of FIGS. 9 and 10, accepts values of the video signals from the CFAR unit 46 during sequential sweeps of the radar 24 to provide a sweep-to-sweep integration of the signals appearing in the various range cells. The succession of output signals of the integration unit 48 is applied to the CFAR unit 50 which, as will be described hereinafter in accordance with the invention, extracts a signal proportional to the standard deviation of the contents of a set of range cells in each sweep, and divides the video signal, after subtraction of the means value thereof, by the standard deviation signal for reducing the effects of clutter. An output signal of the CFAR unit 50 is then applied to the comparator 52 which compares the amplitude of the output signal of the CFAR unit 50 with that of the threshold, the comparator 52 signaling the display 56 when the output signal of the CFAR unit 50 exceeds the threshold. Thereby, the output signal of the comparator 52 serves as a decision that a target is, or is not, present, with the decision being obtained more accurately in view of the reduction of the effect of the clutter. The output signal of the comparator 52 may also be used, by way of example, as an input signal to a well-known track-while-scan computer (not shown) which is often utilized in a radar system for the automatic tracking of targets.

In accordance with the invention, the effect of the clutter is compensated by the CFAR unit 50 which is seen to comprise an averaging unit 60, a summer 62, a divider 64, a delay unit 66, a subtractor 68, a magnitude unit 70, and a second averaging unit 60 coupled to the output terminal of the magnitude unit 70.

The averaging unit 60 comprises four shift registers 71–74, a switch 76, a summer 78, a source 80 of a constant multiplying factor, and a multiplier 82. As will be seen subsequently with reference to FIGS. 5–10, digital circuitry has been employed in the detection unit 44, the CFAR unit 46, and the integration unit 48, an analog-to-digital converter of the detection unit 44 being operated to sample the envelope of the echo signal in response to strobing signals provided by the timing unit 58 at terminal C. Accordingly, the shift registers 71–74 are composed of cells, each of which comprises a set of slots to accommodate the digits of the digital signals. By way of alternative embodiments, it is understood that the units 44, 46 and 48 may be constructed of circuits which utilize analog sampling, in lieu of the digital sampling, in which case the registers 71–74 may be composed of charge-coupled devices (CCD's).

The registers 71 and 72 have an equal number of cells with individual ones of the cells being coupled to the summer 78. Alternatively, the registers 71 and 72 may be viewed as tapped delay lines with one tap at each cell, the registers 71–72 being strobed by timing signals of the timing unit 58 in correspondence with the strobing of the analog-to-digital converter of the detection unit 44 so that the contents of the set of cells of the registers 71–72 correspond to the contents of the set of the range cells 34 of FIG. 1. There are a total of N tapped cells referred to in FIG. 4, with half of them appearing in the register 71 and the remaining half in the register 72. In addition, shift register cells, sometimes referred to as guard cells, are placed between the registers 71 and 72, two such cells appearing in the register 73, and one such cell appearing in the register 74. It is noted that none of the guard cells are coupled to the summer 78. There are two output signals of the averaging unit 60, one output signal appearing at terminal A and the second output signal appearing at terminal B. The output signal at terminal A is obtained at the output terminal of the shift register 71 and, therefore, is seen to be simply a delayed replica of the input signal to the averaging unit 60, the delay being approximately one-half the averaging interval. The summer 78 sums together the signals of the respective cells of the registers 71 and 72, and applies the sum to the multiplier 82. The multiplier 82 scales the sum by the reciprocal of N, provided by the source 80, to provide the mean value at terminal B of a set of N signals at the input terminal of the averaging unit 60.

By use of the guard cells in the registers 73 and 74, the signal samples immediately preceding the signal sample at terminal A do not appear in the summation of the summer 78 since the guard cells of the registers 73 and 74 are not coupled to the summer 78. The arrangement of the guard cells provides a significant improvement in the detection of a target for the situation wherein a target echo overlaps a pair of the range cells. In the design of a radar system, the range cell is selected to have a length which is equal to, or slightly greater than, the length of a target so that a sample of a target echo would appear in either one range cell, or in two contiguous range cells in the event that the target overlaps the boundary of the two range cells. In the case of a relatively strong echo, a signal sample coupled from more than one cell of the registers 71–74 to the summer 78 would considerably offset the value of the average at the instant of time when a signal is being extracted at terminal A from the mid-point of the averaging interval. By virtue of the guard cells, the signal at terminal A is extracted slightly before the mid-point of the averaging interval and, furthermore, the signal of one of the pair of contiguous range cells which were overlapped by the target echo does not contribute to the summation. Thereby, the mean value is more accurately reflected by the circuit of the averaging unit 60 for both strong and weak echo signals. As seen in the Figures, the delayed replica of the video signal, y, appears at the terminal A while an estimate of the means value, m, appears at the terminal B.

As will be seen subsequently with reference to FIG. 11, circuitry may be provided to produce an exact value of the variance of a set of the integrated video signals on line 84, the circuitry including a square-root circuit which converts the variance to the standard deviation. A simplified circuit is provided in FIG. 4 whereby an approximation to the standard deviation is obtained directly, the value of the standard deviation obtained in FIG. 4 being a sufficiently close approximation for reducing the effect of clutter in accordance with the invention. The approximation to the standard deviation is obtained by means of the delay 66, the subtractor 68, the magnitude unit 70 and the averaging unit 60 coupled thereto, an estimate of the standard deviation being shown in the Figure at terminal B of the second averaging unit. This estimate of the standard deviation is substantially proportional to the true value of the standard deviation.

The delay unit 66 has a delay equal to one of the intersample intervals, this being equivalent to the echo delay from one range cell to the next range cell. One sample of the signal on line 84 is coupled directly to the subtractor 68 while the previous signal sample is coupled via the delay unit 66 to the subtractor 68. Thus, the subtractor 68 provides the difference in amplitude between two successive samples of the video signal on line 84. The difference may be positive or negative depending on the relative amplitudes of the two samples. Upon applying the difference to the magnitude unit 70, the magnitude unit 70 deletes the positive or negative sign from the difference to provide only the absolute magnitude of the difference to the second averaging unit 60. The mean value of a set of magnitudes from the magnitude unit 70 is obtained at terminal B of the second averaging unit 60, a mean value being the aforementioned estimate of the standard deviation.

The divider 64 is seen to comprise logarithmic units 85–86, a summer 88, and an inverse logarithmic unit 90. By way of example, the logarithmic units 85–86 may each comprise read-only memories wherein the input signal to each of the logarithmic units 85–86 serves as the address to the memory, the output signal of the memory being the value of the logarithm corresponding to the address. As was noted hereinabove, the value of the estimate of the standard deviation is substantially proportional to the true value of the standard deviation and, accordingly, the proportionality constant is readily accounted for in the read-only memory of the logarithmic unit 86. Thereby, upon the forming of the difference between the logarithm of the unit 85 and the logarithm of the unit 86, the difference being formed by the summer 88, there results the logarithm of the ratio of the output signal of the summer 62 and the standard deviation. The inverse logarithmic unit 90 may similarly be composed of a read-only memory wherein the output signal of the summer 88 serves as the address to the memory, the output signal of the memory thereby being the ratio of the two input signals of the divider 64. As seen in FIG. 4, the summer 62 provides the difference between a delayed replica of the signal on line 84 and an estimate of the mean value. Thereby, the output signal of the divider has the ratio of the output signal of the summer 62 and the standard deviation, that ratio being presented in the Figure.

Figure 5:
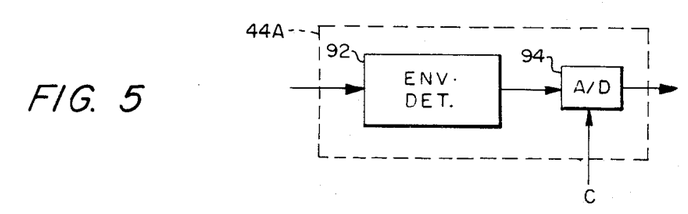
FIGS. 5 and 6 show block diagrams of alternative embodiments of an envelope detection unit of FIG. 4.

Reviewing the operation of the CFAR unit 50, it is seen that the first averaging unit 60 provides a sample of the signal on line 84 at approximately the mid-point of the averaging interval, the averaging unit 60 also providing an estimate of the mean value of a set of the signal samples on line 84. The magnitude of the difference between successive signal samples on line 84 is provided by the delay unit 66, the subtractor 68 and the magnitude unit 70. An average value of these magnitudes is then utilized as an estimate of the standard deviation. At the beginning of a range sweep, it is noted that samples of the signal on line 84 would begin to fill the shift register 71 before these signals are shifted to the register 72. In order to begin operation of the averaging unit 60 prior to the time required for a signal sample to be shifted through all the registers 71-74, the switch 76 is strobed, by a timing signal of the timing unit 58, to switch to the alternate position whereby the single cell register 74 is coupled directly to line 84 so that both the registers 71 and 72 can be simultaneously filled. After the register 72 is filled, the switch reverts to the position shown in FIG. 4 to resume the coupling of signals between the registers 73 and 74. Thus, during the start-up interval, the averaging unit 60 provides an estimate of the mean value based on only one-half of the N cells, the estimate improving as the register 72 is subsequently filled with samples previously present in the register 71. The signals appearing at the terminals A and B of the first averaging unit 60 are then subtracted at the summer 62 to provide the dividend in the division operation of the divider 64 while terminal B of the second averaging unit 60 provides the divisor for the dividing operation of the divider 64. Referring now to FIG. 5, there is seen a block diagram of the envelope detection unit 44 of FIG. 4, the embodiment of FIG. 5 being indentified by the legend 44A. The detection unit 44A is seen to comprise an envelope detector 92 and an analog-to-digital converter 94. The detector 92 detects the envelope of the echo signal at the intermediate frequency from the amplifier system 40. The output signal of the envelope detector 92 is then sampled by the converter 94 to provide a set of digital numbers at instants of time corresponding to the strobing of the converter 94 by clock pulse signals from the timing unit 58 of FIG. 4.

Figure 6:
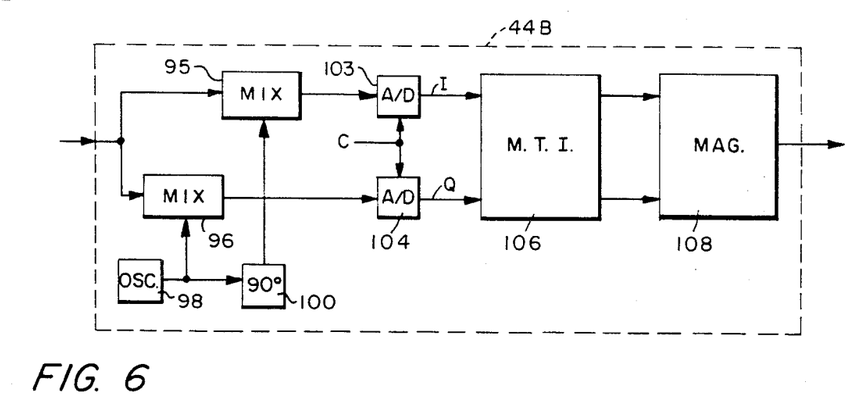

Referring now to FIG. 6, there is seen another embodiment of the envelope detector unit 4 of FIG. 4, this embodiment being identified by the legend 44B. The detection unit 44B is seen to comprise mixers 95-96, an oscillator 98, a 90° phase shifter 100, analog-to-digital converters 103-104, a moving target indicator (MTI) circuit 106 and a magnitude unit 108. The detection unit 44B provides for in-phase and quadrature sampling of the IF signal from the amplifier system 40 by means of the mixers 95-96 which are coupled to in-phase an quadrature reference signals. The reference signals are provided by the oscillator 98, one such signal being coupled directly from the oscillator 98 to the mixer 96 while the second reference is coupled from the oscillator 98 via the phase shifter 100 to the mixer 95. The in-phase and quadrature signals are sampled by the converters 103-104 in response to a strobing by clock pulses from the timing unit 58 of the FIG. 4. The in-phase and quadrature digital signals produced by the converters 103-104 are applied to the MTI circuit 106 which, in a well-known manner, provides complex signals (having the corresponding in-phase and quadrature portions) to a magnitude unit 108 for providing digital numbers representing the presence of a moving target.

Referring now to FIG. 7, there is shown an exemplary embodiment of the CFAR unit 46 of FIG. 4, the embodiment of FIG. 7 being identified by the legend 46A. The CFAR unit 46A is seen to comprise the averaging unit 60, described in FIG. 4, and the divider 64, also described in FIG. 4. In operation, a delayed replica of the input signal appears at terminal A of the averaging unit 60, the mean value of the input signal appears at terminal B of the averaging unit 60, the divider 64 dividing the signal at terminal A by the mean value to provide the desired normalized signal at the output terminal of the CFAR unit 46A.

Referring now to FIG. 8, there is seen another exemplary configuration for the CFAR unit 46 of FIG. 4, the embodiment of FIG. 8 being identified by the legend 46B. The CFAR unit 46B is seen to comprise a logarithmic unit 110 and an inverse logarithmic unit 112 which function in a manner analogous to that of the logarithmic unit 85 and the inverse logarithmic unit 90 of FIG. 4. The CFAR unit 46B further comprises a subtractor 114 and the averaging unit 60, previously described in FIG. 4. Functionally, the CFAR unit 46B of FIG. 8 differs from that of the CFAR unit 46A of FIG. 7 in that the division disclosed in FIG. 7 is accomplished by means of logarithms in FIG. 8. Thus, the logarithmic unit 110 provides a sequence of digital signals which represent the logarithms of the corresponding sequence of input signals to the CFAR unit 46B. The mean value of the logarithms of the input signal appears at terminal B of the averaging unit 60. The subtractor 114 subtracts the mean value of the logarithm from the logarithmic value of the input signal appearing at terminal A to provide the logarithm of the normalized signal. Thereupon, the inverse logarithmic unit 112 converts the output signal of the subtractor 114 to a normalized value of the input signal to the CFAR unit 46B, the normalized value being based on the mean value of the logarithmic representation of the input signal.

Figure 9:
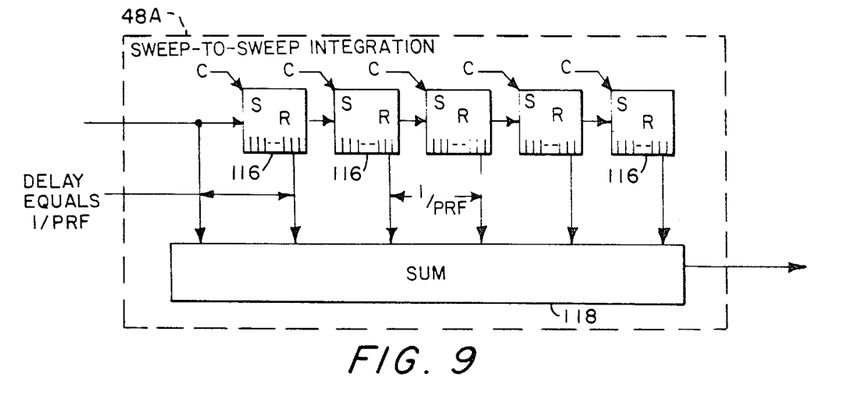
FIGS. 9 and 10 show alternative embodiments of an integrator of FIG. 4.

Referring now to FIG. 9, there is seen an exemplary embodiment of the integration unit 48 of FIG. 4, the embodiment of FIG. 9 being identified by the legend 48A. The integration unit 48A is seen to comprise a set of serially connected shift registers 116 and a summer 118. The shift registers 116 are clocked by timing signals from the timing unit 58 of FIG. 4, the shift registers 116 having taps by which cells thereof are coupled to the summing unit 118. The clocking rate of data through the shift registers 116 is selected to provide a delay between the successive taps which is equal to the reciprocal of the repetition frequency of pulses transmitted by the transmitter 36 of FIG. 4. The shift registers 116 may, if desired, be provided with additional cells to accommodate a varying amount of data in the shift registers 116 for the situation wherein the pulse repetition frequency of the transmitter 36 is to be varied.

Thereby, the temporal spacing between the taps of the respective shift registers 116 is maintained equal to the interpulse interval for both a fixed and a varied pulse repetition frequency. The output signal of the summer 118 is, thus, equal to the sum of a succession of echo signals emanating from the same range cell in each of a succession of range sweeps. A sequence of digital signals appearing at the output terminal of the summer 118 is, therefore, the integral of the signals from respective ones of a sequence of the range cells of a range sweep.

Figure 10:
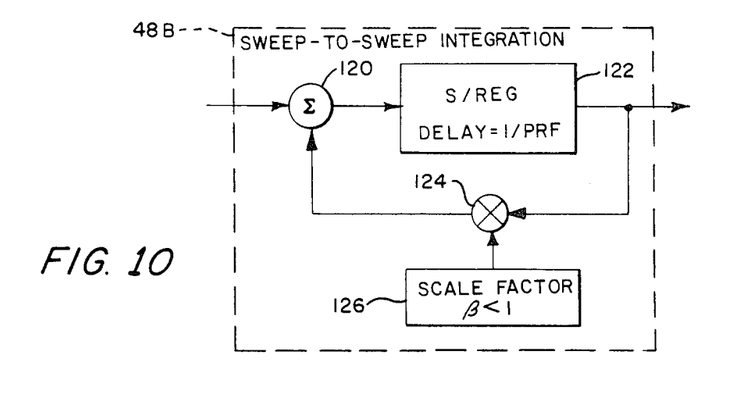

Referring now to FIG. 10, there is seen another exemplary embodiment of the integration unit 48 of FIG. 4, the embodiment of FIG. 10 being identified by the legend 48B. The integration unit is seen to comprise a summer 120, a shift register 122, a multiplier 124 and a source 126 of a scale factor to be utilized by the multiplier 124 in a scaling operation. The magnitude of the scale factor is less than unity. The shift register 122 provides a delay between its input and its output terminals which is equal to the reciprocal of the repetition frequency of the pulses transmitted by the transmitter 36 of FIG. 4. Thereby, the signal samples incident upon the input terminals of the summer 120 correspond to the contents of identical range cells in each of two sequential range sweeps. The summer 120 sums together the values of the contents of sequentially occurring range cells in sequential ones of the range sweeps with the summation being the sum of the contents of a series of the contents of identical range cells of a series of sequential sweeps. The magnitude of the summation is bounded since the scale factor of the source 126 is less than unity. The output terminal of the integration unit 48B therefore provides the integrated value of the contents of each of the range cells of a sweep. This form of integrator is sometimes referred to as a single pole integrator.

Figure 11:
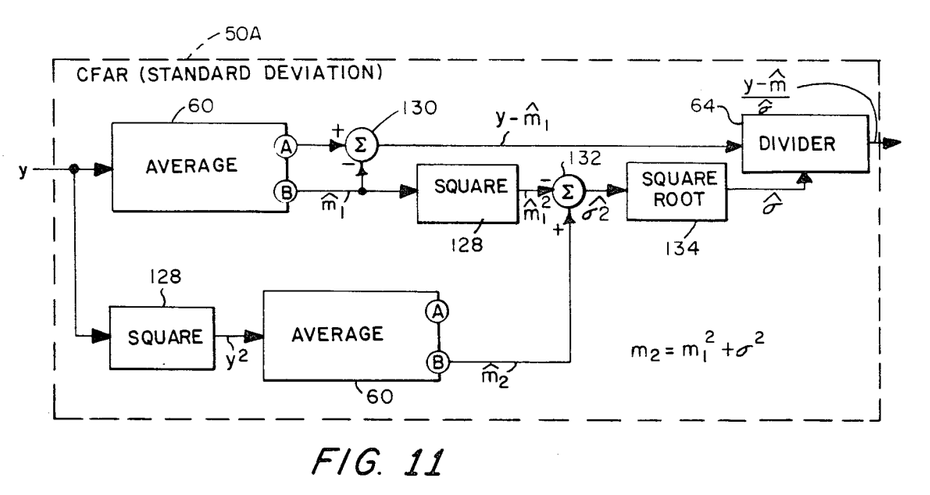
FIGS. 11, 12 and 13 show alternative embodiments of the CFAR unit of FIG. 4.

Referring now to FIG. 11, there is seen a block diagram of a CFAR unit 50A which, in accordance with the invention, utilizes the standard deviation to compensate for the effect of clutter in a manner analogous to that of the CFAR unit 50 of FIG. 4. In lieu of providing an approximation to the standard deviation as was described with reference to FIG. 4, the embodiment of FIG. 11 provides a more accurate value of the standard deviation by utilizing squaring circuits to extract the variance and a square-root circuit to form the standard deviation. The CFAR unit 50A is seen to comprise first and second averaging units 60, the first averaging unit 60 being coupled directly to the input terminal of the CFAR unit 50A while the second averaging unit 60 is coupled via a squaring unit 128 to the input terminal. The CFAR unit 50A further comprises a second squaring unit 128, summers 130 and 132, a square-root unit 134 and the divider 64 which was previously seen in FIG. 4. In FIG. 11, the input signal is indentified by the letter y; the mean value of y is identified by the legend $m_1$; the second moment, or mean value of the square of y, is identified by the legend $m_2$, with the standard deviation being indicated by the legend $\sigma$. The squaring unit 128 and the square-root unit 134 may both be fabricated of read-only memories wherein the input signal to the squaring unit 128, as well as the input signal to the square-root unit 134, serve as address signals to the respective memories with the output signals thereof being, respectively, the squared value, or square-root value, corresponding to the respective addresses. By following the notation in the Figure, it is seen that the squaring unit 128 provides the square of the input signal which is then applied to the second averaging unit 60, the second averaging unit 60 providing at its terminal B the second moment. the first moment appears at the terminal B of the first averaging unit 60, the first moment being coupled both to the summer 130 and to the second squaring unit 128. A delayed replica of the input signal is applied by the terminal A of the first averaging unit to the summer 130, the summer 130 subtracting the mean value from the signal at terminal A. The second squaring unit 128 provides the square of an estimate of the mean value. As seen by and equation in the lower right corner of the Figure the value of the variance may be given in terms of the first and second moments. Accordingly, the summer 132 provides the difference between the second moment and the square of the first moment, that difference being the variance. Upon applying the variance to the square-root unit 134, the standard deviation appears at the output terminal of the square-root unit 134. The divider 64 divides the difference between the input signal minus the mean value thereof and the standard deviation to provide at the output terminal of the CFAR unit 50A a value of the input signal which has been normalized with respect to the standard deviation. In comparing the FIGS. 4 and 11, it is seen that the mathematical expression for the output signals of the CFAR units 50 and 50A are identical.

Figure 12:
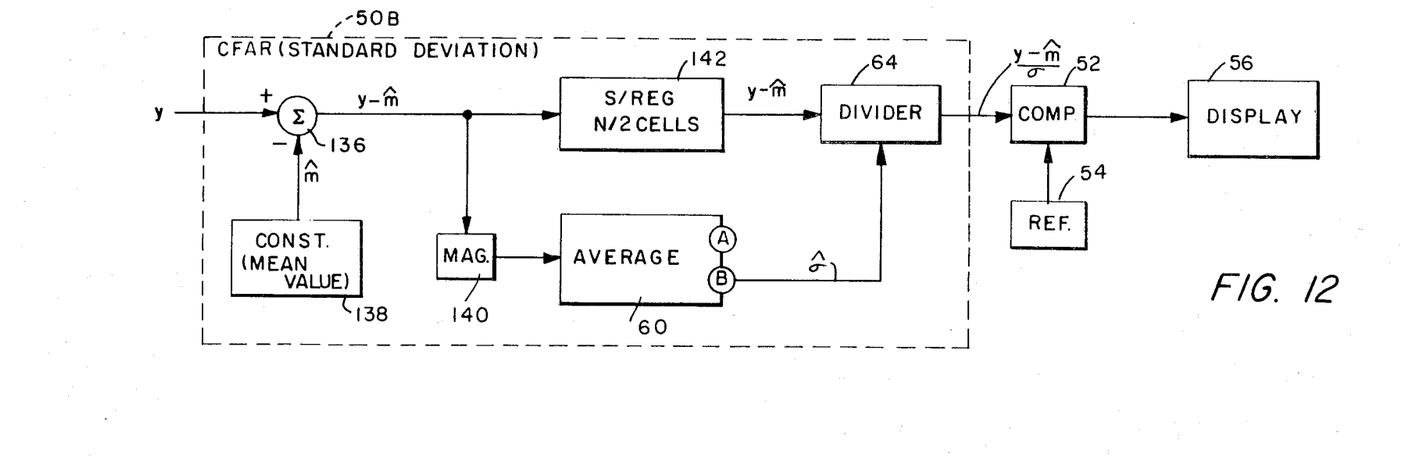
Figure 13:
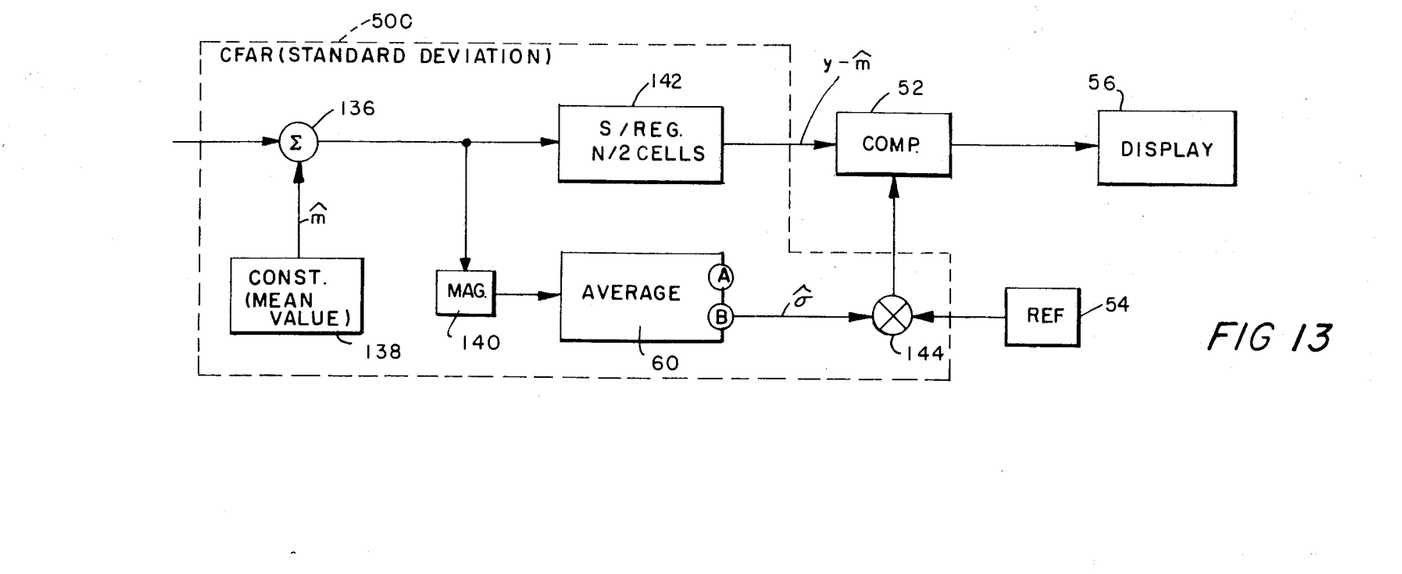

Referring now to FIGS. 12 and 13, there are seen further embodiments of the CFAR unit 50A of FIG. 11, and their interconnection with the comparator 52 of FIG. 4. Both the CFAR units 50B and 50C are seen to comprise a summer 136, a source 138 of a digital number of constant value, a magnitude unit 140, a shift register 142 and the averaging unit 60. The CFAR units 50B and 50C demonstrate alternative methods of applying the standard deviation for altering the ratio between the values of the two signals at the input terminal of the comparator 52. With respect to the CFAR unit 50B, the divider 64 is provided, as was seen in FIGS. 4 and 11, for dividing the signal at the signal input terminal of the comparator 52 by the standard deviation. Alternatively, as seen in FIG. 13, the CFAR unit 50C is provided with a multiplier 144 for multiplying the threshold signal of the reference signal source 54 by the standard deviation. With either the embodiment of FIG. 12 of FIG. 13, the relative magnitude of the signals at the two input terminals of the comparator 52 are the same. If desired, the multiplier 144 may be utilized in the CFAR units 50 and 50A of FIGS. 4 and 11, respectively, in lieu of the divider 64 as has been demonstrated with reference to FIGS. 12 and 13.

The summer 136 subtracts the means value from the input signal y, the mean value from the source 138 being of a constant magnitude in view of the normalizing of the input signal by the CFAR unit 46 of FIG. 4. The register 142 is recognized as having the same number of cells as the register 71 of FIG. 4 for providing the same delay to the signal, y, as is provided by terminal A of the averaging unit 60 of FIG. 4. The magnitude of the difference between the signal, y, and the estimate of the mean value is averaged to provide an estimate of the standard deviation, this being accomplished by the magnitude unit 140 and the averaging unit 60 in FIGS. 12 and 13 in a manner analogous to that described previously with reference to the magnitude unit 70 and the averaging unit 60 of FIG. 4. While, in FIG. 4, the aproximation to the standard deviation was obtained by the subtraction of one sample of y from the next sample of y, in FIGS. 12 and 13 the approximation utilizes the difference between a sample of y and the mean value thereof. While the approximation for the standard deviation in FIGS 12 and 13 results in a value of the standard deviation which is not as accurate as that obtained by the CFAR unit 50A of FIG. 11, the approximation of FIGS. 12 and 13 is sufficiently accurate to provide compensation for the effect of the clutter. The standard deviation is then utilized either in the divider 64 of FIG. 12 or to serve as a multiplying factor in the multiplier 144 of FIG. 13, as noted hereinabove, to provide the desired response from the comparator 52.

It is understood that the above-described embodiments of the invention are illustrative only and that modifications thereof may occur to those skilled in the art. Accordingly, it is desired that this invention is not to be limited to the embodiments disclosed herein, but is to be limited only as defined by the appended claims.

What is claimed is:

1. An echo ranging system having means for adjusting the level of an input signal relative to a threshold level to compensate for a clutter component of said input signal comprising:

means for generating a signal having a value which is representative of a standard deviation of said input signal;

means for altering the ratio of said input signal relative to said threshold level by the value of said generated signals.

said signal generating means comprising: (a) means for determining a plurality of difference between a sample of said input signal and a subsequent sample of said input signal; (b) means coupled to said differences determining means for taking a magnitude of each of said differences; and (c) means for averaging a plurality of said magnitudes to provide said generated signal to said ratio altering means.

2. An echo ranging system having means for adjusting the level of an input signal relative to a threshold level to compensate for a clutter component of said input signal comprising:

means for determining a difference between said input signal and an estimate of a mean of said input signal;

means for generating a signal having a value which is representative of a standard deviation of said input signal;

means for altering the ratio of said signal relative said threshold level by the value of said generated signal; and said signal generating means comprising: (a) means coupled to said difference determining means for taking a magnitude of said difference; and (b) means coumpling to said magnitude means for averaging a plurality of said difference magnitudes to provide to said ratio altering means said generated signal having a value which is representative of a standard deviation of said input signal.

* * * * *

UNITED STATES PATENT OFFICE
CERTIFICATE OF CORRECTION

Patent No. 4,489,319      Dated December 18, 1984

Inventor(s) V. Gregers Hansen

It is certified that error appears in the above-identified patent and that said Letters Patent are hereby corrected as shown below:

Column 6, Line 4:       Change "instart" to --instant--.

Column 7, Line 45:      After the words "divider 64" begin a new paragraph with the word --Referring--.

Column 7, Line 59:      Change "detector" to --detection--.

Column 7, Line 59:      Change "unit 4" to --unit 44--.

Column 7, Line 67:      Change "an" to --and--.

Column 10, Line 12:     After "Figure" insert --,--.

Column 11, Line 30:     After "signals" insert --;--.

Column 12, Line 2:      Change "difference" to --differences--.

Column 12, Line 19:     After "of said" insert --input--.

UNITED STATES PATENT OFFICE
CERTIFICATE OF CORRECTION

Patent No. 4,489,319          Dated December 18, 1984

Inventor(s) V. Gregers Hansen

It is certified that error appears in the above-identified patent and that said Letters Patent are hereby corrected as shown below:

Column 12, Line 19: After "relative" insert --to--.

Column 12, Line 25: Change "coumpling" to --coupled--.

Signed and Sealed this

Sixth Day of August 1985

[SEAL]

Attest:

DONALD J. QUIGG

*Attesting Officer*      *Acting Commissioner of Patents and Trademarks*